(12) United States Patent
Yun et al.

(10) Patent No.: US 9,034,239 B2
(45) Date of Patent: May 19, 2015

(54) METHOD OF FABRICATING A FIBER

(75) Inventors: Yong Ju Yun, Daejeon (KR); Zin Sig Kim, Daejeon (KR); Han Young Yu, Daejeon (KR); Yark Yeon Kim, Daejeon (KR); Won Ick Jang, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 427 days.

(21) Appl. No.: 13/592,270

(22) Filed: Aug. 22, 2012

(65) Prior Publication Data

US 2013/0149532 A1    Jun. 13, 2013

(30) Foreign Application Priority Data

Dec. 7, 2011    (KR) .................. 10-2011-0130313

(51) Int. Cl.
| | |
|---|---|
| D01D 1/02 | (2006.01) |
| D01D 5/253 | (2006.01) |
| D01D 7/00 | (2006.01) |
| B29C 47/00 | (2006.01) |
| D01D 5/00 | (2006.01) |
| B82Y 30/00 | (2011.01) |
| B29C 47/04 | (2006.01) |
| D01D 5/38 | (2006.01) |
| B29C 47/12 | (2006.01) |
| D01F 6/60 | (2006.01) |

(52) U.S. Cl.
CPC .......... *B29C 47/0014* (2013.01); *D01D 5/0038* (2013.01); *B29C 47/12* (2013.01); *B82Y 30/00* (2013.01); *B29C 47/04* (2013.01); *D01D 5/0069* (2013.01); *D01D 5/38* (2013.01); *D01F 6/60* (2013.01)

(58) Field of Classification Search
CPC ....... D01D 1/02; D01D 5/0038; D01D 5/253; D01D 7/00
USPC ......... 264/10, 177.13, 211.12, 464, 465, 466, 264/484
See application file for complete search history.

(56) References Cited

U.S. PATENT DOCUMENTS

2006/0201390 A1* 9/2006 Lahann et al. ................ 106/401
2012/0034461 A1* 2/2012 Stevens .................... 264/465 X

FOREIGN PATENT DOCUMENTS

KR   10-2003-0093892 A   12/2003
KR   10-2011-0099475 A   9/2011

* cited by examiner

*Primary Examiner* — Leo B Tentoni

(57) ABSTRACT

Provided are fiber fabrication method and the fiber fabricated thereby. In this method, different monomer solutions are electrospun through nozzles whose outlets are stuck to each other and simultaneously interfacially polymerized to form a polymer fiber without a complicated process of preparing a polymer solution. Therefore, a polymer fiber can be simply prepared.

9 Claims, 11 Drawing Sheets

METHOD OF FABRICATING A FIBER

CROSS-REFERENCE TO RELATED APPLICATIONS

This U.S. non-provisional patent application claims priority under 35 U.S.C. §119 of Korean Patent Application No. 10-2011-0130313, filed on Dec. 7, 2011, the entire contents of which are hereby incorporated by reference.

BACKGROUND

The present disclosure herein relates to a fiber fabrication method and the fiber fabricated thereby.

Because of increase of population and development of industries, demand for a new fiber having a superior function in comparison with a natural fiber has been increased. Since 1900, fibers could be artificially synthesized by development of science. In 1938, a new synthetic fiber named as "Nylon" had been announced by DuPont company of United States. Then, various fibers such as polyester fiber, acryl fiber, polyurethane fiber and so on had been developed. Recently, a new fiber of high performance and super high function and a nanofiber have been actively studied by using a new material transcending the limits of a conventional material.

However, various processes have been developed and used in order to fabricate a nanofiber and a new fiber having various high functions. As technologies for fabricating a nanofiber, there are complex melt-spinning, melt blown, CVD (Chemical vapor deposition) and biological method which can directly fabricate fibers whose diameters are nano size. Although the complex melting spinning method can produce nanofibers of diameter of about 20 nm, the complex melting spinning method requires a process of dividing fibers and cannot be applied to a material which is easily damaged by heat. The melt blown method is easy and frequently performed. However, the melt blown method cannot perform spinning fibers of diameters under 500 nm and cannot be applied to a material which is easily damaged by heat. Recently, as a technology for fabricating a nanofiber, electrospinning method has been developed and being used. The electrospinning method is a technology of fabricating a nanofiber using electric field and can spin at a room temperature, control surface structure, perform a hybridization and use all kinds of polymers. However, production yield is low and the electrospinning method needs recovery of solvent and explosion-proof equipment. Therefore, in order to effectively fabricate fibers, more superior technology and devices are required.

SUMMARY

The present disclosure provides a method of easily and fast fabricating a fiber of a various shape such as single or bundle strand without multi-step process.

The present disclosure provides a fiber fabricated by the method.

Embodiments of the inventive concept provide a method of fabricating a fiber, including: fabricating at least two monomer solutions which are different from each other; preparing at least two nozzles whose outlets are stuck to each other; electrospinning the monomer solutions to a collector through the nozzles and simultaneously performing an interfacial polymerization with respect to the monomer solutions to form a polymer fiber; and separating the polymer fiber from the collector.

The fabricating of the monomer solutions may include dispersing monomers in a solvent.

The monomer may be at least one selected from a group consisting of tetramethylene diamine, pentamethylene diamine adipic acid, hexamethylene diamine, m-phenylenediamine, adipic acid, sebacic acid, terephthalic acid, isophthalic acid, p-phenylene diamine, terephtaloyl dichloride, m-Benzenedisulfonyl chloride, caprolactam, ethylene glycol, terephthalic acid, 1,4-butanediol, terephthalic acid, 1,3 propanediol, terephthalic acid, naphthalene dicarboxylic acid, 4-hydroxybenzoic acid, and 6-hydroxynaphthalene-2-carboxylic acid, or an acid chloride of the at least one.

The solvent may be at least one selected from a group consisting of water, acetic acid($C_2H_4O_2$), acetone($C_3H_6O$), acetonitrile($C_2H_3N$), benzene($C_6H_6$), 1-butanol($C_4H_{10}O$), 2-butanol($C_4H_{10}O$), 2-butanone($C_4H_8O$), t-butyl alcohol ($C_4H_{10}O$), carbon tetrachloride($CCl_4$), chlorobenzene ($C_6H_5Cl$), chloroform($CHCl_3$), cyclohexane($C_6H_{12}$), 1,2-dichloroethane($C_2H_4Cl_2$), chlorobenzene, dichloromethane ($CH_2Cl_2$), ethyl ether($C_4H_{10}O$), diethylene glycol ($C_4H_{10}O_3$), diglyme (diethylene glycol, dimethyl ether) ($C_6H_{14}O_3$), 1,2-dimethoxy-ethane (glyme, DME) ($C_4H_{10}O_2$), dimethylether($C_2H_6O$), dimethyl-formamide (DMF) ($C_3H_7NO$), dimethyl sulfoxide(DMSO) ($C_2H_6OS$), dioxane($C_4H_8O2$), ethanol($C_2H_6O$), ethyl acetate($C_4H_8O_2$), ethylene glycol($C_2H_6O_2$), glycerin($C_3H_8O_3$), heptanes ($C_7H_{16}$), hexamethylphosphoramide(HMPA) ($C_6H_{18}N_3OP$), hexamethylphosphorous triamide(HMPT) ($C_6H_{18}N_3P$), hexane ($C_6H_{14}$), methanol($CH_4O$), methyl t-butyl ether(MTBE) ($C_5H_{12}O$), methylene chloride($CH_2Cl_2$), N-methyl-2-pyrrolidinone (NMP) ($CH_5H_9NO$), nitromethane($CH_3NO_2$), pentane($C_5H_{12}$), petroleum ether (ligroine), 1-propanol ($C_3H_8O$), 2-propanol($C_3H_8O$), pyridine($C_5H_5N$), tetrahydrofuran(THF) ($C_4H_8O$), toluene($C_7H_8$), triethyl amine($C_6H_{15}N$), o-xylene($C_8H_{10}$), m-xylene($C_8H_{10}$), and p-xylene($C_8H_{10}$).

The fabricating of the monomer solutions may include dispersing monomers and an additive in a solvent and the additive may be at least one selected from a group consisting of gold, silver, platinum, titanium oxide, fullerene, carbon nanotube, graphene, graphene oxide, chitosan and collagen, or a compound of the at least one.

At least one of the nozzles may have at least two outlets.

The outlet may have a cross section of a hexagon, circle, square, rectangle, triangle, or polygon.

The outlet may have a width ranging from 0.1 mm to 1 mm.

The outlet may have a cross-section of polygon whose one side length is ranging from 0.1 mm to 1 mm.

Embodiments of the inventive concept provide a polymer fiber including polymer fine fibers of at least two strands which are stuck and formed of different materials each other.

At least one of the polymer fine fibers may be at least one selected from a group consisting of gold, silver, platinum, titanium oxide, fullerene, carbon nanotube, graphene, graphene oxide, chitosan and collagen, or a compound of the at least one.

The polymer fiber may include polymer fine fibers of at least three strands and a hollow structure.

BRIEF DESCRIPTION OF THE DRAWINGS

The accompanying drawings are included to provide a further understanding of the inventive concept, and are incorporated in and constitute a part of this specification. The drawings illustrate exemplary embodiments of the inventive concept and, together with the description, serve to explain principles of the inventive concept. In the drawings.

DETAILED DESCRIPTION OF THE EMBODIMENTS

Preferred embodiments of the present invention will be described below in more detail. The invention may, however, be embodied in many different forms and should not be construed as being limited to the embodiments set forth herein; rather, these embodiments are provided so that this disclosure will be thorough and complete, and will fully convey the concept of the invention to those skilled in the art.

Figure 1:
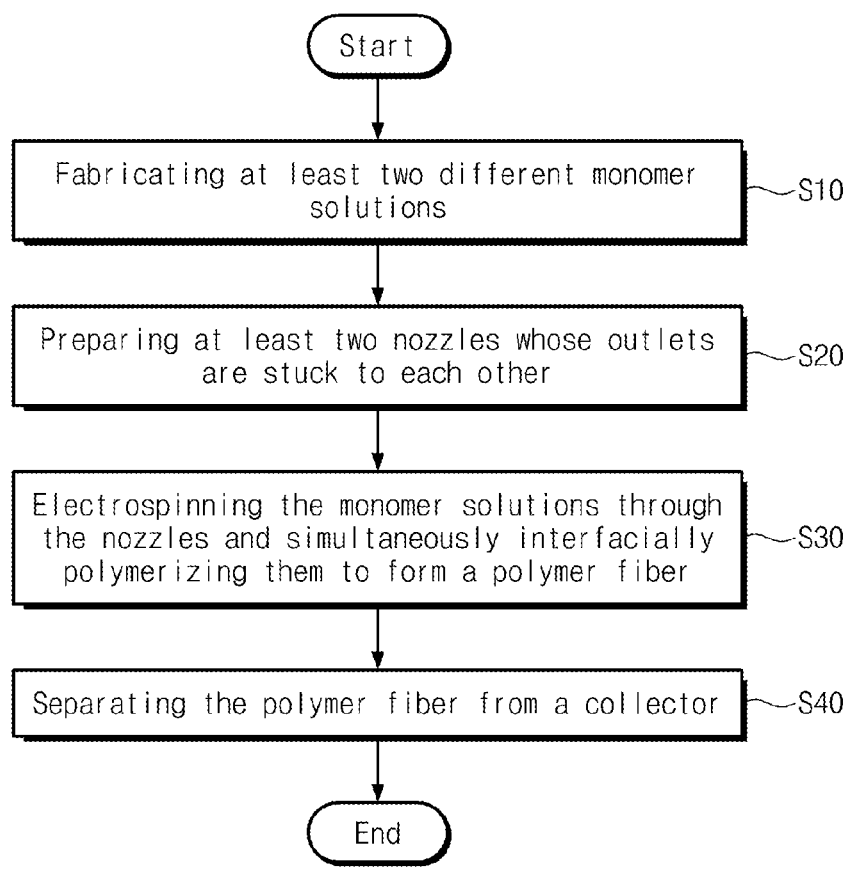
FIG. 1 is a flowchart illustrating a method of fabricating a fiber according to an example of the inventive concept.
Figure 2:
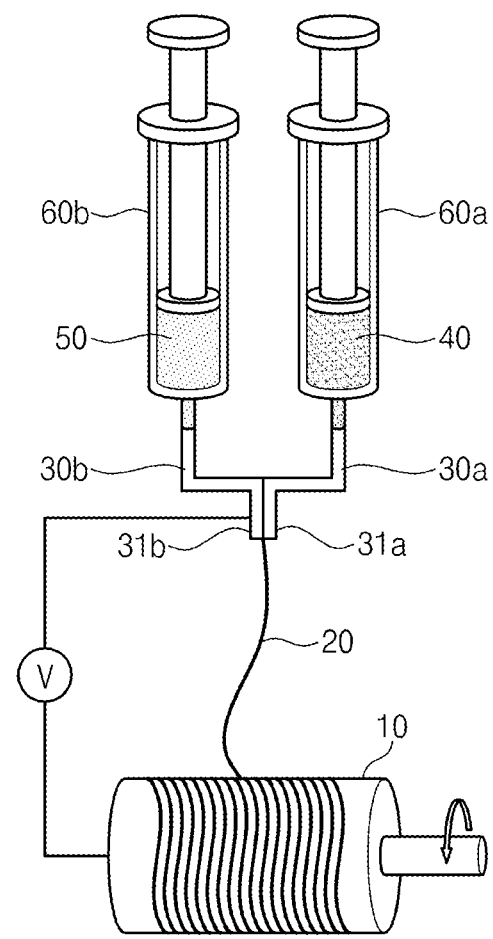
FIG. 2 is a drawing showing a step of fabricating a fiber according to an example of the inventive concept.

FIG. 1 is a flowchart illustrating a method of fabricating a fiber according to an example of the inventive concept. FIG. 2 is a drawing showing a step of fabricating a fiber according to an example of the inventive concept.

Referring to FIGS. 1 and 2, in the method of fabricating a fiber according to an example of the inventive concept, at least two monomer solutions 40 and 50, which are different each other, are fabricated (A first step, S10). The monomer solutions 40 and 50 include a first monomer solution 40 and a second monomer solution 50. The first step S10 may be performed by dispersing monomers which are different each other in a solvent. The monomer solutions 40 and 50 may include monomers, respectively, which can be interfacially polymerized when they meet each other.

The monomer may be at least one selected from a group consisting of tetramethylene diamine, pentamethylene diamine adipic acid, hexamethylene diamine, m-phenylenediamine, adipic acid, sebacic acid, terephthalic acid, isophthalic acid, p-phenylene diamine, terephtaloyl dichloride, m-Benzenedisulfonyl chloride, caprolactam, ethylene glycol, terephthalic acid, 1,4-butanediol, terephthalic acid, 1,3 propanediol, terephthalic acid, naphthalene dicarboxylic acid, 4-hydroxybenzoic acid, and 6-hydroxynaphthalene-2-carboxylic acid, or an acid chloride of the at least one.

The solvent may be at least one selected from a group consisting of water, acetic acid($C_2H_4O_2$), acetone($C_3H_6O$), acetonitrile($C_2H_3N$), benzene($C_6H_6$), 1-butanol($C_4H_{10}O$), 2-butanol($C_4H_{10}O$), 2-butanone($C_4H_8O$), t-butyl alcohol ($C_4H_{10}O$), carbon tetrachloride($CCl_4$), chlorobenzene ($C_6H_5Cl$), chloroform($CHCl_3$), cyclohexane($C_6H_{12}$), 1,2-dichloroethane($C_2H_4Cl_2$), chlorobenzene, dichloromethane ($CH_2Cl_2$), ethyl ether($C_4H_{10}O$), diethylene glycol ($C_4H_{10}O_3$), diglyme (diethylene glycol, dimethyl ether) ($C_6H_{14}O_3$), 1,2-dimethoxy-ethane (glyme, DME) ($C_4H_{10}O_2$), dimethylether($C_2H_6O$), dimethyl-formamide (DMF) ($C_3H_7NO$), dimethyl sulfoxide(DMSO) ($C_2H_6OS$), dioxane($C_4H_8O2$), ethanol($C_2H_6O$), ethyl acetate($C_4H_8O_2$), ethylene glycol($C_2H_6O_2$), glycerin($C_3H_8O_3$), heptanes ($C_7H_{16}$), hexamethylphosphoramide(HMPA) ($C_6H_{18}N_3OP$), hexamethylphosphorous triamide(HMPT) ($C_6H_{18}N_3P$), hexane ($C_6H_{14}$), methanol($CH_4O$), methyl t-butyl ether(MTBE) ($C_5H_{12}O$), methylene chloride($CH_2Cl_2$), N-methyl-2-pyrrolidinone (NMP) ($CH_5H_9NO$), nitromethane($CH_3NO_2$), pentane($C_5H_{12}$), petroleum ether (ligroine), 1-propanol ($C_3H_8O$), 2-propanol($C_3H_8O$), pyridine($C_5H_5N$), tetrahydrofuran(THF) ($C_4H_8O$), toluene($C_7H_8$), triethyl amine($C_6H_{15}N$), o-xylene($C_8H_{10}$), m-xylene($C_8H_{10}$), and p-xylene($C_8H_{10}$).

The first step S10 may disperse an additive as well as the monomers in the solvent. The additive may be at least one selected from a group consisting of gold, silver, platinum, titanium oxide, fullerene, carbon nanotube, graphene, graphene oxide, chitosan and collagen, or a compound of the at least one.

Referring to FIGS. 1 and 2, at least two nozzles whose outlets are stuck to each other are prepared (A second step, S20).

Figure 3A:
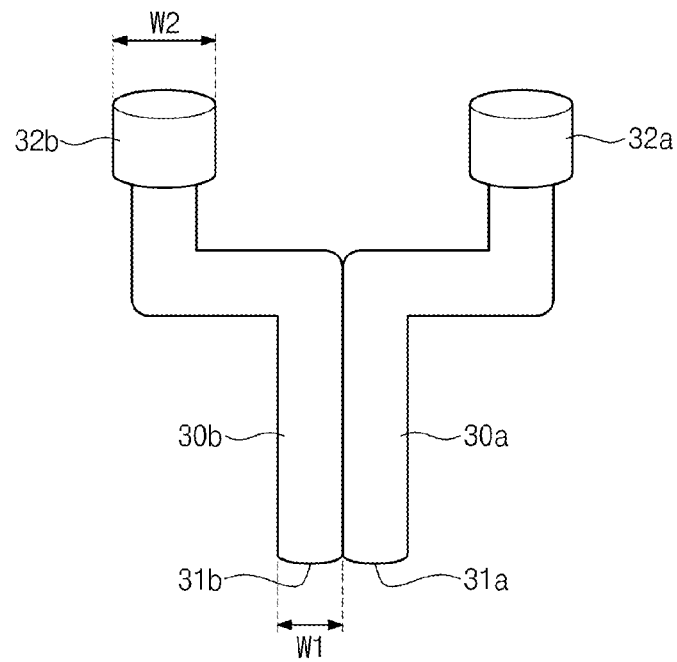
FIGS. 3A through 3C are perspective views of nozzles according to examples of the inventive concept.
Figure 3B:
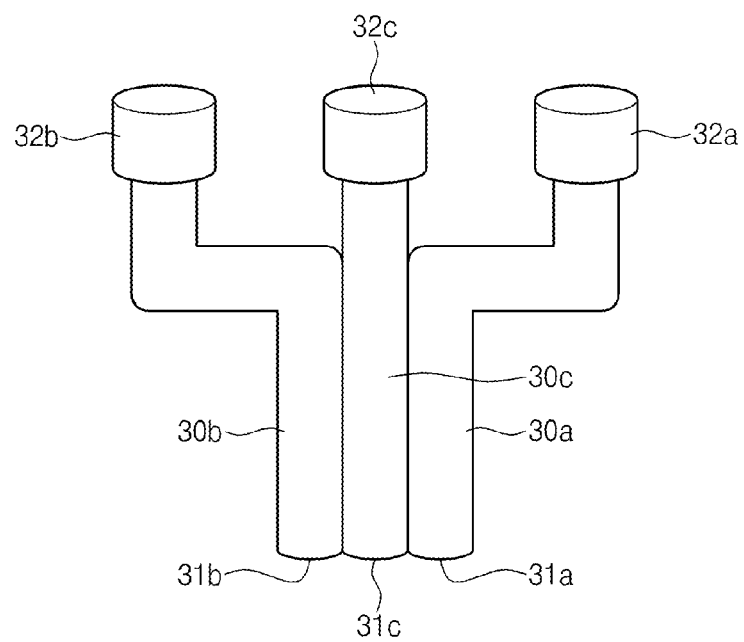
Figure 3C:
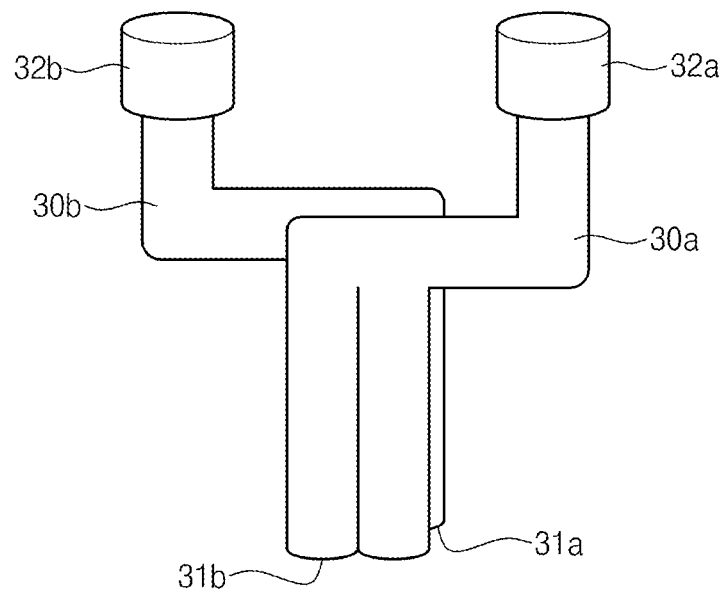

FIGS. 3A through 3C are perspective views of nozzles according to examples of the inventive concept.

Referring to FIG. 3A, a first nozzle 30a may have a first outlet 31a and a first inlet 32a. A second nozzle 30b may have a second outlet 31a and a second inlet 31b. The inlets 32a and 32b of the first and second nozzles 30a and 30b are separated from each other but the outlets 31 and 31b of them are stuck to each other. The width W1 of the outlets 31a and 31b may range from 0.1 mm to 1 mm. The width W2 of the inlets 32a and 32b may range from 0.1 mm to 10 mm.

Alternatively, referring to FIG. 3B, a first nozzle 30a may have a first outlet 31a and a first inlet 32a. A second nozzle 30b may have a second outlet 31b and a second inlet 32b. A third nozzle 30c may have a third outlet 31c and a third inlet 32c. The inlets 32a, 32b and 32c of the first through third nozzles 30a, 30b and 30 c are separated from each other but the outlets 31a, 31b and 31c of them are stuck to each other.

Alternatively, referring to FIG. 3C, a first nozzle 30a may have two first outlets 31a and one first inlet 32a. A second nozzle 30b may have two second outlets 31b and one second inlet 32b. The inlets 32a and 32b of the first and second nozzles 30a and 30b are separated from each other but the outlets 31a and 31b of them are stuck to each other.

The number of the nozzles may be at least two, and shapes of the outlets may be various.

FIGS. 4A through 4J are cross sectional views of outlets of nozzles according to examples of the inventive concept.

Figure 4A:
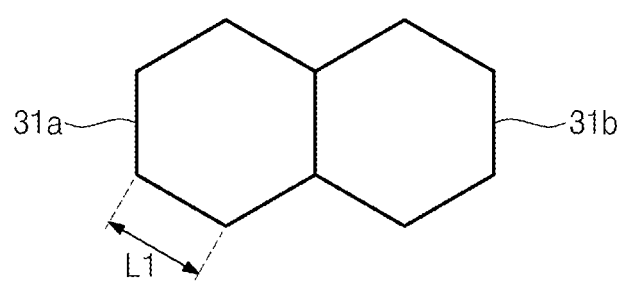
FIGS. 4A through 4J are cross sectional views of outlets of nozzles according to examples of the inventive concept.
Figure 4B:
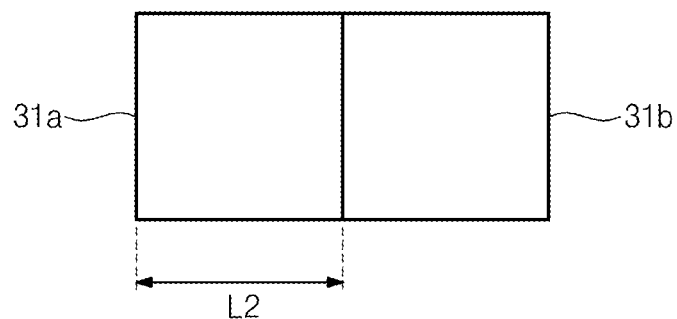
Figure 4C:
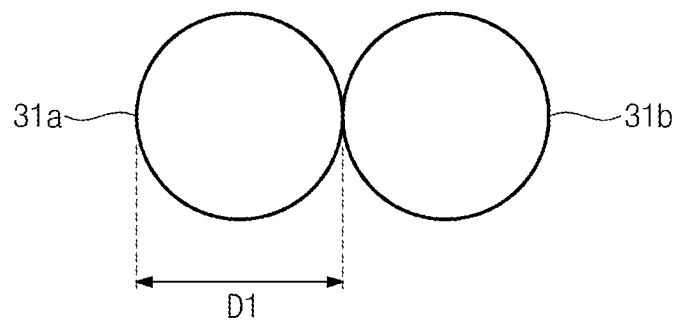
Figure 4D:
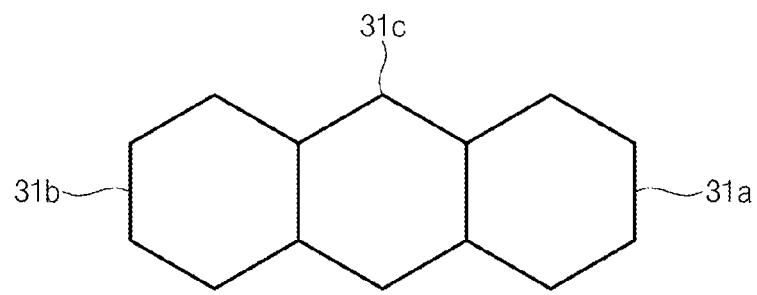
Figure 4E:
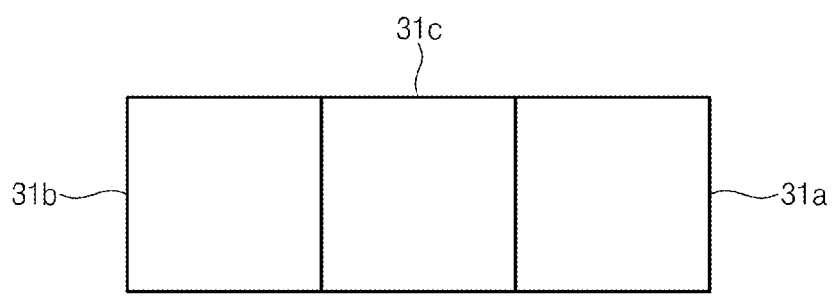
Figure 4F:
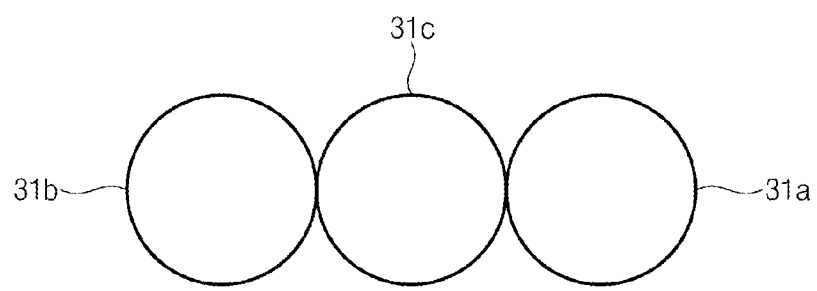
Figure 4G:
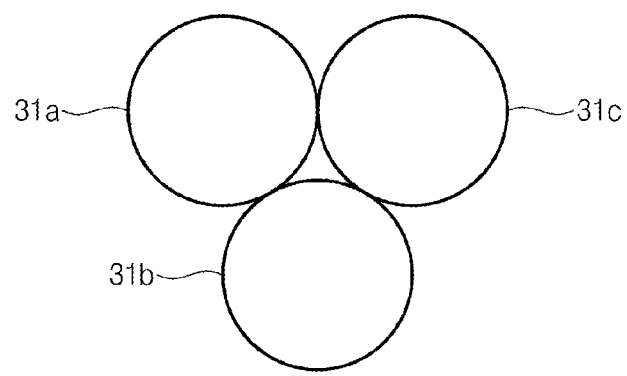

Referring to FIGS. 4A through 4C, first and second outlets 31a and 31b of the nozzles 30a and 30b in FIG. 3A may have cross sections of hexagon, square or circle, respectively. At this time, a side length L1 of the hexagon or a side length L2 of the square may range from 0.1 mm to 1 mm. Alternatively, a diameter D1 of the circle may range from 0.1 mm to 1 mm. The two hexagons, squares, or circles are in contact with each other.

Alternatively, referring to FIGS. 4D through 4G, first through third outlets 31a, 31b and 31c of the nozzles 30a, 30b and 30c in FIG. 3B may have cross sections of hexagon, square or circle, respectively. At this time, a side length of the hexagon or the square may range from 0.1 mm to 1 mm. Alternatively, a diameter of the circle may range from 0.1 mm to 1 mm. The three hexagons, squares, or circles are in contact with each other.

Figure 4H:
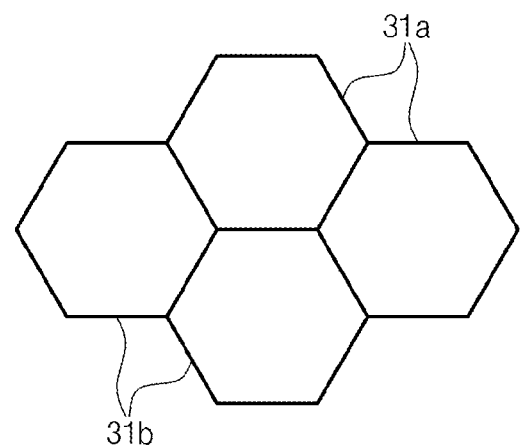
Figure 4I:
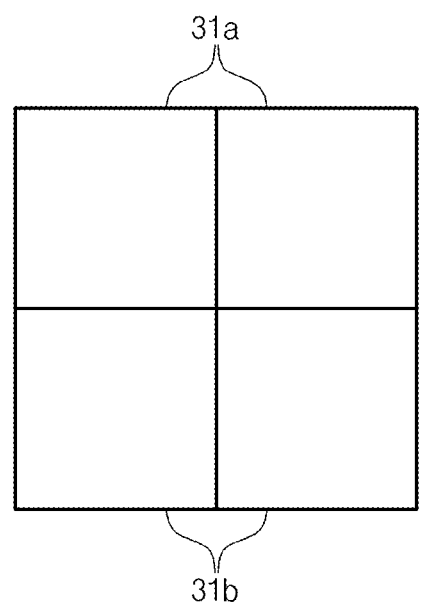

Alternatively, referring to FIGS. 4H through 4I, first and second outlets 31a and 31b of the nozzles 30a and 30b in FIG. 3C may have cross sections of hexagon, square or circle, respectively. At this time, a side length of the hexagon or the square may range from 0.1 mm to 1 mm. Alternatively, a diameter of the circle may range from 0.1 mm to 1 mm The four hexagons, squares, or circles are in contact with each other.

Figure 4J:
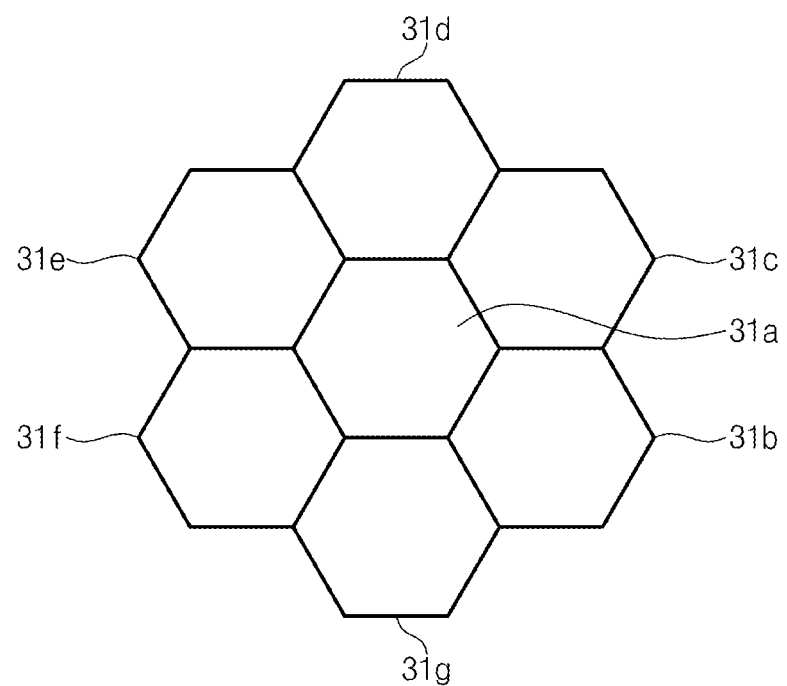

Alternatively, referring to FIG. 4J, there are provided seven nozzles whose first through seventh outlets 31a, 31b, 31c, 31d, 31e, 31f and 31g are stuck to each other and whose cross sections are hexagons.

Referring to FIGS. 1 and 2 again, monomer solutions 40 and 50 are electrospun to a collector 10 through the nozzles 30a and 30b and interfacially polymerized to form a polymer fiber 20 (A third step, S30). For the third step S30, first, the first monomer solution 40 and the second monomer solution 50 are injected into a first container 60a and a second container 60b, respectively. The containers 60a and 60b may be syringes. Then, outlets of the first and second containers 60a and 60b are connected with first and second nozzles 30a and 30b, respectively. A specific voltage is applied to the nozzles 30a and 30b and the collector 10 and the monomer solutions 40 and 50 are electrospun to a surface of the collector 10 through the nozzles 30a and 30b. At this time, the monomer solutions 40 and 50 instantly meet each other at the moment when they come out from the nozzles 30a and 30b. At the moment, a interfacial polymerization reaction occurs between the monomer solutions 40 and 50 to form a polymer fiber. The collector 10 may have a cylinder shape and be rotated. The polymer fiber may be wound on a surface of the rotating collector 10.

Figure 5A:
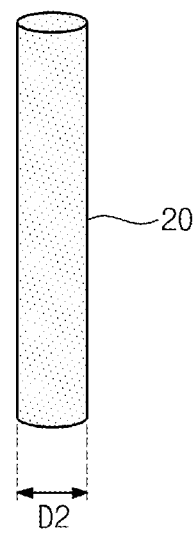
FIGS. 5A through 5D are polymer fibers fabricated by examples of the inventive concept.
Figure 5B:
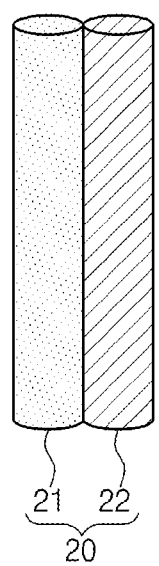
Figure 5C:
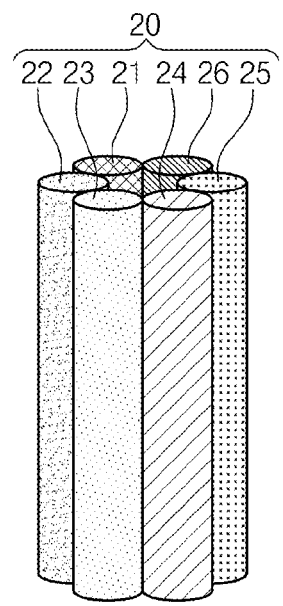

The shapes of the polymer fiber may be explained by referring to FIGS. 5A through 5C.

If two monomer solutions 40 and 50 are electrospun through nozzles 30a and 30b whose outlets 31a and 31b are stuck to each other as explained by referring to FIGS. 2, 3A, 4A through 4C, a polymer fiber 20 of one strand may be formed as shown in FIG. 5A. That is, a first monomer and a second monomer, which are different each other, meet and are interfacially polymerized to form one polymer fiber. A width D2 of the polymer fiber 20 may range from 1 nm to 100 μm.

If three monomer solutions are electrospun by using a nozzle explained by referring to FIGS. 3, 4D through 4G, there may be formed a polymer fiber 20 including two polymer fine fibers 21 and 22 of two strands which are stuck to each other as shown in FIG. 5B. At this time, a first monomer solution, a second monomer solution and a third monomer solution, which are different from each other, may be electrospun through a first nozzle 30a, a second nozzle 30b and a third nozzle 30c, respectively. The first monomer and the third monomer meet each other and are interfacially polymerized to form a first polymer fine fiber 21 and the second monomer and the third monomer meet each other and are interfacially polymerized to form a second polymer fine fiber 22. The first polymer fine fiber 21 and the second polymer fine fiber 22 may compose a final polymer fiber 20 with being stuck to each other.

If seven monomer solutions are electrospun by using the seven nozzles having the first through seven outlets 31a, 31b, 31c, 31d, 31e, 31f and 31g, there may be formed a polymer fiber 20 having polymer fine fibers 21, 22, 23, 24, 25 and 26 of six strands and a hollow structure as shown in FIG. 5C. At this time, a first monomer solution is spun through the first outlet 31a which is located at the center in FIG. 4J and simultaneously second through seven monomer solutions are electrospun through the second through seven outlets 31b, 31c, 31d, 31e, 31f and 31g, respectively. The first monomer solution is interfacially polymerized with the second through seven monomer solutions, respectively, to form a polymer fiber 20 having a first through six polymer fine fibers 21, 22, 23, 24, 25 and 26 which are stuck to each other. If all of the second through seven monomer solutions are different from each other, the first through six polymer fine fibers 21, 22, 23, 24, 25 and 26 may be formed of different polymer materials. If some of the second through seven monomer solutions are identical, some of the first through six polymer fine fibers 21, 22, 23, 24, 25 and 26 may be formed of the same polymer materials. If all of the second through seven monomer solutions are identical, all of the first through six polymer fine fibers 21, 22, 23, 24, 25 and 26 may be formed of the same polymer materials.

Figure 5D:
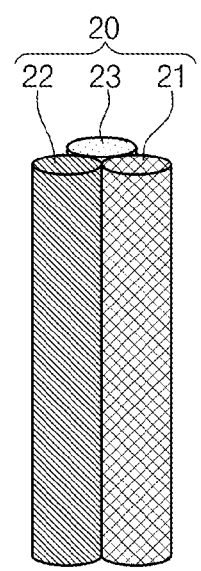

Alternatively, referring to FIG. 5D, by a method that is identical to/similar with the method explained above, a polymer fiber 20 including polymer fine fibers 21, 22 and 23 of three strands. At this time, the polymer fiber 20 may have a hollow structure.

The number and shapes of the nozzles may not be limited to the examples explained by referring to the figures but be various. Furthermore, shapes and thicknesses of the fabricated polymer fibers may be various by the shapes of the nozzles and the number of the monomer solutions. If three or more monomer solutions are used, two or more monomer solutions out of them may be identical to each other.

After fabricating the polymer fiber 20, referring to FIG. 1, again, the polymer fiber 20 is vacuum-dried, thermally treated and separated from the collector 10 (A fourth step, S40).

EXPERIMENTAL EXAMPLE 1

Fabrication of Polyamide 6,6(Nylon)

① A first step: Hexamethylenediamine of 1 g was input in distilled water and stirred during 1 hour by a stirrer to prepare hexamethylenediamine solution (A first monomer solution). Adipic acid of 1 ml was input in hexane solution of 50 ml and stirred during 1 hour by a stirrer to prepare adipic solution (A second monomer solution).

② A second step: A first nozzle 30a and a second nozzle 30b were prepared in FIGS. 2, 3A and 4A.

③ A third step: The hexamethylenediamine solution and the adipic solution were injected into a first syringe 60a and a second syringe 60b of FIG. 2, respectively. With the conditions of applied voltage 15 KV, a distance between the nozzles 30a and 30b and the collector 10, 10 cm, and a rate of injecting the solutions, 10 ml/h, the solutions were eletrospun through the first and second nozzles 30a and 30b and the hexamethylenediamine and the adipic acid are interfacially polymerized to form the Nylon fiber.

④ A fourth step: The Nylon fiber was washed with distilled water and dried during 24 hours in a vacuum oven. Then the Nylon fiber was separated from the collector 10.

EXPERIMENTAL EXAMPLE 2

Fabrication of a Complex Fiber of Graphene Oxide-Polyamide 6,6(Nylon)

① A first step: A graphene oxide-containing solution was prepared. First, SP-1 graphite powder was treated by using modified Hummers and Offenmans method to prepare graphene oxide. The graphene oxide powder was added by about 0.05~0.5 wt. % with respect to distilled water and the solution was dispersed during 4 hours by using an ultrasonic generator. Hexamethylenediamine of 1 g was input in the graphen oxide-containing solution and stirred during one hour by a stirrer to prepare a graphene oxide-containing hexamethylenediamine solution (A first monomer solution). Adipic acid of 1 ml was input in hexane solution of 50 ml and stirred during 1 hour by a stirrer to prepare adipic solution (A second monomer solution).

② A second step: A first nozzle 30a and a second nozzle 30b were prepared in FIGS. 2, 3A and 4A.

③ A third step: The graphene oxide-containing hexamethylenediamine solution and the adipic solution were injected into a first syringe 60a and a second syringe 60b of FIG. 2, respectively. With the conditions of applied voltage 15 KV, a distance between the nozzles 30a and 30b and the collector 10, 10 cm, and a rate of injecting the solutions, 10 ml/h, the solutions were eletrospun through the first and second nozzles 30a and 30b and the hexamethylenediamine and the adipic acid are interfacially polymerized to form a graphene oxide-containing Nylon fiber.

④ A fourth step: The Nylon fiber was washed with distilled water and dried during 24 hours in a vacuum oven. Then the graphene oxide-containing Nylon fiber was separated from the collector 10.

In the method of fabricating a fiber according to the inventive concept, the whole process of fabricating a fiber can be simplified. A fiber of a various shape such as single or bundle strand and a fiber composed of several kind materials can be fabricated simply and effectively. Furthermore, it is possible to fabricate a fiber whose thickness is about several nanometers or several millimeters. An organic material and an inorganic material can be mixed to form a complex fiber of new shapes. Therefore, the methods and the fibers of the inventive concept can be applied to medical, environmental and energy industries.

The above-disclosed subject matter is to be considered illustrative and not restrictive, and the appended claims are intended to cover all such modifications, enhancements, and other embodiments, which fall within the true spirit and scope of the inventive concept. Thus, to the maximum extent allowed by law, the scope of the inventive concept is to be determined by the broadest permissible interpretation of the following claims and their equivalents, and shall not be restricted or limited by the foregoing detailed description.

What is claimed is:

1. A method of fabricating a fiber, comprising:
    fabricating at least two monomer solutions which are different from each other;
    preparing at least two nozzles whose outlets are stuck to each other;
    electrospinning the monomer solutions to a collector through the nozzles and simultaneously performing an interfacial polymerization with respect to the monomer solutions to form a polymer fiber; and
    separating the polymer fiber from the collector.

2. The method of claim 1, wherein the fabricating of the monomer solutions comprises dispersing monomers in a solvent.

3. The method of claim 2, wherein the monomer is at least one selected from a group consisting of tetramethylene diamine, pentamethylene diamine adipic acid, hexamethylene diamine, m-phenylenediamine, adipic acid, sebacic acid, terephthalic acid, isophthalic acid, p-phenylene diamine, terephtaloyl dichloride, m-Benzenedisulfonyl chloride, caprolactam, ethylene glycol, terephthalic acid, 1,4-butanediol, terephthalic acid, 1,3 propanediol, terephthalic acid, naphthalene dicarboxylic acid, 4-hydroxybenzoic acid, and 6-hydroxynaphthalene-2-carboxylic acid, or an acid chloride of the at least one.

4. The method of claim 2, wherein the solvent is at least one selected from a group consisting of water, acetic acid $(C_2H_4O_2)$, acetone($C_3H_6O$), acetonitrile($C_2H_3N$), benzene $(C_6H_6)$, 1-butanol($C_4H_{10}O$), 2-butanol($C_4H_{10}O$), 2-butanone($C_4H_8O$), t-butyl alcohol($C_4H_{10}O$), carbon tetrachloride($CCl_4$), chlorobenzene($C_6H_5Cl$), chloroform $(CHCl_3)$, cyclohexane($C_6H_{12}$), 1,2-dichloroethane $(C_2H_4Cl_2)$, chlorobenzene, dichloromethane($CH_2Cl_2$), ethyl ether($C_4H_{10}O$), diethylene glycol($C_4H_{10}O_3$), diglyme (diethylene glycol, dimethyl ether) $(C_6H_{14}O_3)$, 1,2-dimethoxyethane (glyme, DME) $(C_4H_{10}O_2)$, dimethylether($C_2H_6O$), dimethyl-formamide(DMF) $(C_3H_7NO)$, dimethyl sulfoxide (DMSO) $(C_2H_6OS)$, dioxane($C_4H_8O2$), ethanol($C_2H_6O$), ethyl acetate($C_4H_8O_2$), ethylene glycol($C_2H_6O_2$), glycerin $(C_3H_8O_3)$, heptanes($C_7H_{16}$), hexamethylphosphoramide(HMPA) $(C_6H_{18}N_3OP)$, hexamethylphosphorous triamide(HMPT) $(C_6H_{18}N_3P)$, hexane $(C_6H_{14})$, methanol($CH_4O$), methyl t-butyl ether(MTBE) $(C_5H_{12}O)$, methylene chloride $(CH_2Cl_2)$, N-methyl-2-pyrrolidinone (NMP) $(CH_5H_9NO)$, nitromethane($CH_3NO_2$), pentane($C_5H_{12}$), petroleum ether (ligroine), 1-propanol($C_3H_8O$), 2-propanol($C_3H_8O$), pyridine($C_5H_5N$), tetrahydrofuran(THF) $(C_4H_8O)$, toluene $(C_7H_8)$, triethyl amine($C_6H_{15}N$), o-xylene($C_8H_{10}$), m-xylene $(C_8H_{10})$, and p-xylene($C_8H_{10}$).

5. The method of claim 1, wherein the fabricating of the monomer solutions comprising dispersing monomers and an additive in a solvent, the additive being at least one selected from a group consisting of gold, silver, platinum, titanium oxide, fullerene, carbon nanotube, graphene, graphene oxide, chitosan and collagen, or a compound of the at least one.

6. The method of claim 1, wherein at least one of the nozzles has at least two outlets.

7. The method of claim 1, wherein the outlet has a cross section of a hexagon, circle, square, rectangle, triangle, or polygon.

8. The method of claim 1, wherein the outlet has a width ranging from 0.1 mm to 1 mm.

9. The method of claim 1, wherein the outlet has a cross-section of polygon whose one side length is ranging from 0.1 mm to 1 mm.

* * * * *